Patented Nov. 27, 1945

2,389,806

UNITED STATES PATENT OFFICE 2,389,806

STABILIZING ORGANO-SILOXANES

Rob Roy McGregor, Verona, and Earl Leathen Warrick, Pittsburgh, Pa., assignors to Corning Glass Works, Corning, N. Y., a corporation of New York No Drawing. Application June 22, 1944,
Serial No. 541,671

6 Claims. (Cl. 260—607)

This invention relates to organo-siloxanes, and particularly to the stabilization thereof.

This application is a continuation-in-part of our copending application Serial No. 432,530 filed February 26, 1942 and assigned to the assignee of the present invention.

Organo-siloxanes are compositions comprising essentially silicon atoms connected to each other by oxygen atoms through silicon-oxygen linkages, thus

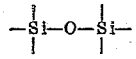

and organic radicals attached through carbon-silicon linkages to at least some of the silicon atoms. They may be prepared by the hydrolysis of a hydrolyzable organo-mono-silane followed by condensation (partial or complete) of the hydrolysis product. They may also be prepared by hydrolyzing and condensing mixtures of different hydrolyzable organo-monosilanes, as described in the copending application of James Franklin Hyde, Serial Number 432,528 filed February 26, 1942, and assigned to the assignee of the present invention. In the latter case, hydrolyzable silanes which contain no organic radicals attached to silicon through carbon-silicon linkages, such as silicon tetrachloride or ethyl orthosilicate, may be included with the organo-silanes, if desired. By employing such mixtures of silanes, it is possible to prepare organo-siloxanes which contain on the average up to and including three organic radicals per silicon atom.

By hydrolyzable organo-monosilanes, we mean derivatives of $SiH_4$, which contain hydrolyzable radicals such as halogens, amino groups, alkoxy, aroxy and acyloxy radicals, etc., and organic radicals that are joined to silicon through carbon-silicon linkages. Examples of such organic radicals are as follows: aliphatic radicals such as methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc., naphthyl, mono- and poly-alkyl naphthyls as methyl naphthyl, diethyl naphthyls, tri-propyl naphthyl, etc.; tetrahydro-naphthyl, anthracyl, etc.; aralkyl such as benzyl, phenyl-ethyl, etc.; alkenyl such as methallyl, allyl, etc., and heterocylic radicals. The above organic radicals may also, if desired, contain inorganic substituents such as halogens, etc.

Hydrolysis of the above silanes or mixtures thereof is generally accompanied by condensation of the intermediately formed hydroxy compounds to form siloxane linkages, thus,

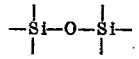

The formation of a siloxane linkage generally results from the close approach of two hydroxyl groups and subsequent elimination of water. It may also result from the close approach of one hydroxyl group to a hydrolyzable group such as halogen, acyloxy, or alkoxy, etc., and subsequent elimination of hydrogen halide, carboxylic acid or alcohol, respectively. Such eliminations are catalyzed by mineral acids, especially hydrochloric and sulphuric, and by alkali metal hydroxides, especially sodium hydroxide. As a result of the hydrolysis and concurrent condensation, organo-siloxanes are produced which are partially or completely condensed and which have on the average up to and including three organic radicals attached to each silicon atom. The organo-siloxanes, as previously mentioned, consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as halogens, alkoxy, etc., listed above as the hydrolyzable radicals.

The organo-siloxanes so obtained, some of which are liquids, others solids, differ with respect to their resistance to heat. In general, the partially condensed liquid siloxanes undergo a change in physical properties when heated, becoming more viscous, until finally they may become solids. On the other hand, those which are completely condensed, or nearly so (i. e., substantially free of hydroxyl groups), are extremely resistant to further change due to heat alone.

However, even the latter may be further polymerized by contact with acidic agents, alkaline agents, or with air, as disclosed in the copending applications of James Franklin Hyde, Serial No. 481,155, filed March 30, 1943; Serial No. 481,154, filed March 30, 1943; and Serial No. 451,354, filed July 17, 1942, all being assigned to the assignee of the present invention.

All the organo-siloxanes, both solid and liquid, undergo a gradual change in properties when exposed to the combined effect of heat and air for a prolonged period of time. This is true even of the completely condensed siloxanes. In the case of the liquid organo-siloxanes, the effect of heat and air is manifested by an increase in viscosity, frequently followed by gelation. This is objectionable where the liquid is being utilized as a hydraulic fluid, dielectric medium and the like. The resinous solid siloxanes, after long exposure to oxygen at elevated temperatures, also undergo a change in properties, becoming less flexible and tough until eventually they reach an extremely brittle stage. Such changes in properties due to heat or to heat and air combined are obviously undesirable.

The primary object of this invention is to stabilize organo-siloxanes.

Another object is to provide a method by which changes of properties of organo-siloxanes due to heat and/or oxygen can be prevented.

Another object is to provide a stabilizer for organo-siloxanes.

We have discovered that the stability of an organo-siloxane may be substantially improved by incorporating therein a minor proportion of a naphthol. From 0.05 to 5 per cent, preferably from 0.1 to 1.5 per cent by weight of the stabilizer may be included in the composition to advantage. Although larger amounts of stabilizer may be used, if desired, little advantage is gained thereby. The so-formed stabilized composition exhibits a marked improvement in resistance to change under the influence of heat and air and to small quantities of agents which tend to cause polymerization of the siloxanes.

Among the naphthols which may be employed in accordance with our invention are $\alpha$-naphthol, $\beta$-naphthol, 1,2-naphthalene-diol, 1,3-naphthalene-diol, 1,4-naphthalene-diol, 1,5-naphthalene-diol, 1,6-naphthalene-diol, 1,7-naphthalene-diol, 1,8-naphthalene-diol, 2,3-naphthalene-diol, 2,6-naphthalene-diol and 2,7-naphthalene-diol.

The effectiveness of the naphthols in stabilizing the organo-siloxanes may be demonstrated by comparing the change in viscosity over a period of time at 230° C. in air of an organo-siloxane to which no stabilizer had been added with an organo-siloxane to which a stabilizer had been added. By way of illustration, samples of a liquid dimethyl silicone (prepared by the acid catalyzed hydrolysis of dimethyldiethoxysilane) were treated with 1% by weight of different naphthols. The treatment consisted in adding the stabilizer to the liquid dimethyl silicone and then heating the mixture in air at 230° C. The viscosities of the dimethyl silicone before and after heating for various lengths of time were determined by measuring the number of seconds required for a given amount of the liquid at room temperature to flow from an arbitrarily chosen capillary pipette. The following table shows the viscosities in seconds after heating for various lengths of time of two samples stabilized with $\alpha$- and $\beta$-naphthols respectively and of one unstabilized sample.

TABLE

*Viscosities after heating*

| | Hours at 230° C. | | | | | | | | |
|---|---|---|---|---|---|---|---|---|---|
| | 0 | 21 | 45 | 48 | 93 | 113 | 329 | 496 | 912 |
| $\alpha$-naphthol | 19 | 21.8 | 23.8 | | 32.2 | | 59.2 | 74.0 | 75.0 |
| $\beta$-naphthol | 19 | | 26.8 | | | | 70.2 | | Solid |
| No stabilizer | 19 | 53 | | Solid | | | | | |

It will be noted that the sample to which no stabilizer was added became solid in 48 hours, but samples containing a stabilizer remained liquid for over a month at this elevated temperature.

We have found that the naphthols are not only effective in stabilizing the partially dehydrated siloxanes, but also the completely dehydrated siloxanes. These completely dehydrated siloxanes are ordinarily quite stable substances but they undergo oxidation and possible rearrangement in the presence of oxygen at elevated temperatures, whereby the use of stabilizers becomes important. However, the use of the stabilizer is particularly advantageous in the case of liquid organo-siloxanes having on the average from approximately one to approximately two monovalent organic radicals attached to each silicon atom, at least some of the radicals being alkyl radicals, since these siloxanes are particularly sensitive to heat and air at elevated temperatures. Examples of these are ethyl siloxanes, propyl siloxanes, amyl siloxanes, etc. and the aryl alkyl siloxanes such as phenyl methyl siloxanes, phenyl ethyl siloxanes, etc.

In general organo-siloxanes treated in accordance with our invention are more resistant to change in physical properties under the influence of heat and air. Specifically the liquid organo-siloxanes are thereby rendered more resistant to increase in viscosity or polymerization due to the effects of heat, the action of oxygen and catalysts in general. Because of their low pour points, small change of viscosity with temperature and inertness to rubber, they are useful as hydraulic fluids for the transmission of pressure, and also as damping media for delicate instruments and recoil mechanisms or shock absorbing devices. The resinous solid organo-siloxanes when stabilized in accordance with our invention retain their flexibility and toughness for a greater length of time and are thereby rendered more useful as electrically insulating coatings for metallic conductors, etc.

We claim:

1. The method of stabilizing an organo-siloxane which comprises incorporating therein stabilizing amounts of a naphthol selected from the class consisting of $\alpha$-naphthol and $\beta$-naphthol, the organic substituents of said siloxane consisting essentially of monovalent hydrocarbon radicals attached to silicon through carbon-silicon linkages.

2. A composition of matter comprising an organo-siloxane and a minor proportion of a naphthol selected from the class consisting of $\alpha$-naphthol and $\beta$-naphthol, the organic substituents of said siloxane consisting essentially of monovalent hydrocarbon radicals attached to silicon through carbon-silicon linkages.

3. A composition of matter comprising a liquid polymeric organo-siloxane and a minor proportion of a naphthol selected from the class consisting of $\alpha$-naphthol and $\beta$-naphthol, said organo-siloxane having on the average from approximately 1 to approximately 2 monovalent hydrocarbon radicals attached to each silicon atom through carbon-silicon linkages, at least some of said hydrocarbon radicals being alkyl radicals.

4. A composition of matter comprising a liquid organo-siloxane comprising essentially structural units of the formula $(CH_3)_2SiO$, and a minor proportion of a naphthol selected from the class consisting af α-naphthol and β-naphthol.

5. A composition of matter comprising a liquid methyl siloxane comprising essentially structural units of the formula $(CH_3)_2SiO$ and a minor proportion of α-naphthol.

6. A composition of matter comprising a liquid methyl siloxane comprising essentially structural units of the formula $(CH_3)_2SiO$ and a minor proportion of β-naphthol.

ROB ROY McGREGOR.
EARL LEATHEN WARRICK.